United States Patent
Ueda et al.

(10) Patent No.: US 12,500,293 B2
(45) Date of Patent: Dec. 16, 2025

(54) AIR BATTERY

(71) Applicant: KABUSHIKI KAISHA TOSHIBA, Tokyo (JP)

(72) Inventors: Kakuya Ueda, Kawasaki (JP); Keigo Hoshina, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 660 days.

(21) Appl. No.: 17/823,651

(22) Filed: Aug. 31, 2022

(65) Prior Publication Data

US 2023/0299390 A1  Sep. 21, 2023

(30) Foreign Application Priority Data

Mar. 16, 2022  (JP) .................. 2022-041193

(51) Int. Cl.
*H01M 12/08* (2006.01)
*H01M 4/02* (2006.01)
(Continued)

(52) U.S. Cl.
CPC .......... *H01M 12/08* (2013.01); *H01M 4/405* (2013.01); *H01M 10/0562* (2013.01); *H01M 2004/027* (2013.01); *H01M 2300/0071* (2013.01)

(58) Field of Classification Search
CPC .. H01M 4/382; H01M 4/405; H01M 10/0562; H01M 12/08; H01M 2004/027; H01M 2300/0017; H01M 2300/0071
See application file for complete search history.

(56) References Cited

U.S. PATENT DOCUMENTS

2009/0311596 A1 * 12/2009 Visco .................... H01M 6/045
429/188
2013/0045428 A1 * 2/2013 Visco .................... H01M 12/08
429/405
(Continued)

FOREIGN PATENT DOCUMENTS

JP 2014-209454 A 11/2014
JP 2015-153532 A 8/2015
(Continued)

OTHER PUBLICATIONS

KR20140091247A, Park, et al. "Lithium Air Battery", machine English translation retrieved from https://worldwide.espacenet.com Date: May 1, 2025 (Year: 2014).*

(Continued)

*Primary Examiner* — Matthew W Van Oudenaren
*Assistant Examiner* — Jared Hansen
(74) *Attorney, Agent, or Firm* — Oblon, McClelland, Maier & Neustadt, L.L.P.

(57) ABSTRACT

According to one embodiment, provided is an air battery including a negative electrode, an air electrode to which oxygen is supplied, a solid electrolyte layer positioned between the negative electrode and the air electrode, an aqueous electrolyte layer positioned between the solid electrolyte layer and the air electrode, and a proton conduction layer positioned between the aqueous electrolyte layer and the air electrode. The aqueous electrolyte layer includes an aqueous electrolyte including a polyprotic acid having two or more carboxyl groups, an electrolyte salt, and water.

7 Claims, 3 Drawing Sheets

(51) Int. Cl.
*H01M 4/40* (2006.01)
*H01M 10/0562* (2010.01)

(56) References Cited

U.S. PATENT DOCUMENTS

| | | |
|---|---|---|
| 2014/0295291 A1 | 10/2014 | Kondo et al. |
| 2015/0228984 A1* | 8/2015 | Ball .................... H01M 12/08 |
| | | 429/405 |
| 2018/0241107 A1* | 8/2018 | Su ........................ H01M 4/368 |
| 2021/0167449 A1* | 6/2021 | Choi ................... H01M 4/9016 |
| 2021/0296687 A1* | 9/2021 | Lee ..................... H01M 12/08 |

FOREIGN PATENT DOCUMENTS

| | | | |
|---|---|---|---|
| JP | 2016-58211 A | | 4/2016 |
| JP | 2016-195012 A | | 11/2016 |
| JP | 2017-27735 A | | 2/2017 |
| JP | 2019-133841 A | | 8/2019 |
| KR | 20140091247 A | * | 7/2014 |
| WO | WO 2013/028574 A2 | | 2/2013 |

OTHER PUBLICATIONS

Japanese Office Action issued Feb. 12, 2025 in Japanese Patent Application No. 2022-041193, (with unedited computer-generated English translation), 6 pages.
Stevens et al. "Development of a Lithium Air Rechargeable Battery", ECS Trans. 28 (32), 2010, 13 Pages.

\* cited by examiner

AIR BATTERY

CROSS-REFERENCE TO RELATED APPLICATION

This application is based upon and claims the benefit of priority from prior Japanese Patent Application No. 2022-041193 filed Mar. 16, 2022, the entire contents of which are incorporated herein by reference.

FIELD

Embodiments described herein relate generally to an air battery.

BACKGROUND

In recent years, the market for portable information appliances such as mobile phones and electronic mail terminals has expanded rapidly. As reduction in size and weight of these appliances have progressed, the power supplies are also demanded to be smaller and lighter. For these portable appliances, at present, lithium ion secondary batteries having a high energy density are primarily used, but a higher capacity is demanded.

An air battery, which uses oxygen in the air as a positive electrode active material, has no need to internally incorporate an active material within the positive electrode, and is thus anticipated to achieve higher capacity per volume and weight. For example, as a lithium secondary battery using metal lithium as a negative electrode active material and oxygen as a positive electrode active material, a lithium-air secondary battery is known.

DETAILED DESCRIPTION

According to one embodiment, provided is an air battery including a negative electrode, an air electrode to which oxygen is supplied, a solid electrolyte layer positioned between the negative electrode and the air electrode, an aqueous electrolyte layer positioned between the solid electrolyte layer and the air electrode, and a proton conduction layer positioned between the aqueous electrolyte layer and the air electrode. The aqueous electrolyte layer includes an aqueous electrolyte including a polyprotic acid having two or more carboxyl groups, an electrolyte salt, and water.

A lithium-air battery has a high energy density per weight, and is therefore anticipated as a next-generation high capacity battery. In the conventional lithium-air battery, however, a discharge product having low solubility precipitates as solid matter during discharge. The discharge product plugs pores of a positive electrode and poisons a catalyst contained in a positive electrode, reducing the capacity and cycle performance. For example, in a nonaqueous lithium-air battery that operates under an acidic condition, $Li_2O_2$ precipitates in the nonaqueous electrolyte in association with discharging. In an aqueous lithium-air battery that operates under a non-acidic condition, for example, LiOH is generated in association with discharging. The LiOH concentration in the aqueous electrolyte increases as the discharge proceeds, and the basicity of the electrolyte increases. In the aqueous air battery, the capacity that can be obtained up until reaching the solubility limit of LiOH in the electrolyte is approximately 143 mAh/mL.

The above problem may be solved by using, as a liquid electrolyte, an aqueous solution containing a polyprotic carboxylic acid such as citric acid, so as to improve the solubility of the discharge product. The capacity that can be obtained up until reaching the solubility limit of the lithium citrate is 285 mAh/mL, and the capacity may be improved to be nearly double by using citric acid. However, the polyprotic carboxylic acid is decomposed on the positive electrode (air electrode) in the voltage range in which the air battery operates. Due to decomposition of the polyprotic carboxylic acid, there is a limit to improvement of the cycle performance.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

The air battery according to the embodiment includes a negative electrode, an air electrode (positive electrode) to which oxygen is supplied, a solid electrolyte layer, an aqueous electrolyte layer, and a proton conduction layer. The solid electrolyte layer is positioned between the negative electrode and the air electrode. The aqueous electrolyte layer is positioned between the solid electrolyte layer and the air electrode, and includes an aqueous electrolyte. The aqueous electrolyte includes a polyprotic acid having two or more carboxyl groups, an electrolyte salt, and water. The proton conduction layer is positioned between the aqueous electrolyte layer and the air electrode.

A salt of a polyprotic acid having two or more carboxyl groups has a high solubility in water. Thus, by using such a polyprotic acid, precipitation of a solid matter of the discharge product such as LiOH can be suppressed, and the salt of the polyprotic acid itself does not easily precipitate, therefore, the discharge capacity can be greatly improved. A specific example of the polyprotic acid includes citric acid. Citric acid is a polyprotic acid having two or more carboxyl groups.

The polyprotic acid (RH) may be dissolved in the aqueous electrolyte in a state of being dissociated into protons ($H^+$) and anions ($R^-$) within the aqueous solvent. Protons may be generated also by a reaction between a polyprotic acid and carrier ions (cations such as $Li^+$) supplied from the negative electrode when the air battery is discharged. The protons can pass through the proton conduction layer and reach the air electrode. When the air battery is discharged, oxygen supplied from the outside of the battery to the air electrode side is reduced at the air electrode by the reduction reaction with protons supplied through the proton conduction layer and electrons (e⁻) supplied from the negative electrode via an external circuit (and load). The protons generated by electrolysis of water at the air electrode during charging can be supplied to the aqueous electrolyte layer via the proton conduction layer. The proton conduction layer exhibits selective conductivity with respect to protons. Specifically, polyprotic acid anions cannot pass through the proton conduction layer. Since the polyprotic acid anions do not reach the air electrode, decomposition of anions on the air electrode is prevented. That is, since the air battery according to the embodiment is provided with the proton conduction layer positioned between the aqueous electrolyte layer and the air electrode, decomposition of the polyprotic acid is suppressed. Therefore, the air battery can exhibit excellent cycle performance.

The negative electrode may include a negative electrode active material. The negative electrode active material may include, for example, an alkali metal such as lithium (Li), an alkaline earth metal, or an alloy containing these metal elements. The negative electrode active material may include other metals such as aluminum and zinc, or an alloy containing these metal elements. Alternatively, the negative electrode active material includes, for example, a material into/out from which the above-described metal elements are inserted-extracted.

In a specific example of the air battery, the negative electrode active material includes one or more selected from the group consisting of a lithium metal, a lithium alloy, and a material into/out from which lithium is inserted-extracted. That is, the air battery may be a lithium-air battery. Cations of alkali metal such as lithium or alkaline earth metal contained in the negative electrode active material serves as carrier ions that migrate between the negative electrode and the air electrode in association with charging and discharging of the air battery. Specific examples of carrier ions other than lithium ions (Li⁺) may include sodium ions (Na⁺), potassium ions (K⁺), cesium ions (Cs⁺), calcium ions (Ca²⁺), magnesium ions (Mg²⁺), aluminum ions (Al³⁺), and zinc ions (Zn²⁺). That is, the air battery according to the embodiment is not limited to a lithium-air battery, and may be another air battery or metal-air battery such as a sodium-air battery.

The solid electrolyte layer is positioned between the negative electrode and the air electrode, more specifically, between the negative electrode and the aqueous electrolyte layer. The solid electrolyte layer functions as a separator that electrically insulates the air electrode and the negative electrode without impeding movement of carrier ions (Li and the like) from the negative electrode to the air electrode. The solid electrolyte layer may have, for example, ion conductivity. When an active material having high reactivity with water such as metal lithium is used for the negative electrode, the negative electrode can be blocked from the aqueous electrolyte by the solid electrolyte layer.

The air battery may further include an intermediate layer positioned between the negative electrode and the solid electrolyte layer. Contact between the negative electrode and the solid electrolyte layer may cause a reaction resulting in deterioration of the solid electrolyte. BY providing the intermediate layer, the reaction between the negative electrode and the solid electrolyte layer can be prevented. The intermediate layer may include a nonaqueous electrolyte as a negative electrode side electrolyte.

The negative electrode, solid electrolyte layer, aqueous electrolyte layer, proton conduction layer, air electrode, and optional intermediate layer may configure an electrode group. The air battery may include a container member that houses the electrode group.

In addition, the air battery may further include a negative electrode terminal electrically connected to the negative electrode, and a positive electrode terminal electrically connected to the air electrode (positive electrode).

The air battery may further include an air diffusion layer functioning as a supply path for supplying air containing oxygen from the outside of the container member to the air electrode. The air diffusion layer may be provided between the container member and the air electrode. Alternatively, a part of the container member may constitute the air diffusion layer.

Figure 1:
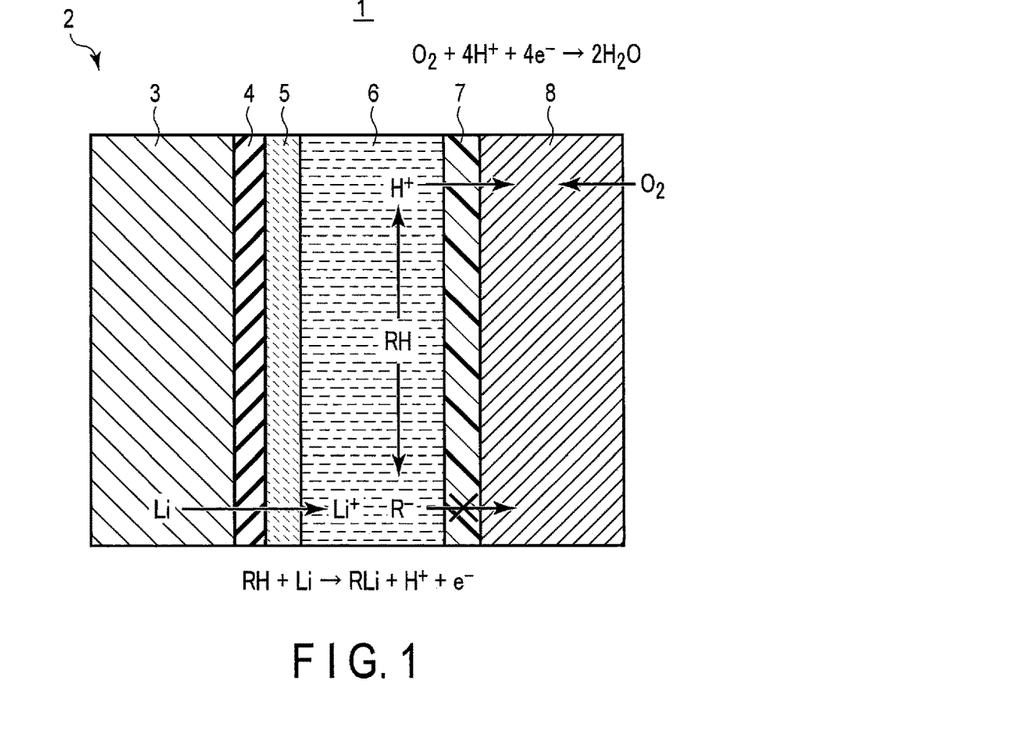
FIG. 1 is a conceptual diagram representing an example of an air battery according to an embodiment.

An example of the air battery according to the embodiment is outlined in FIG. 1. FIG. 1 is a conceptual diagram representing an example of the air battery according to the embodiment. FIG. 1 represents the operation of the air battery during discharge.

The illustrated air battery 1 includes an electrode group 2, and the electrode group 2 includes a negative electrode 3, an intermediate layer 4, a solid electrolyte layer 5, an aqueous electrolyte layer 6, a proton conduction layer 7, and an air electrode 8. In the electrode group 2, the negative electrode 3 and the like are arranged in the order described above.

In the example illustrated, the negative electrode 3 contains as a negative electrode active material, a metal or alloy containing lithium, or a material into/out from which lithium (lithium ions) is inserted-extracted. The aqueous electrolyte layer 6 includes an aqueous electrolyte including a polyprotic acid (RH) and an electrolyte salt as solutes. In the example illustrated, the aqueous electrolyte layer 6 contains, for example, a lithium salt as an electrolyte salt. That is, the exemplified air battery 1 is an aqueous solution-based lithium-air battery or lithium ion-air battery. The polyprotic acid is dissolved in water contained in the aqueous electrolyte as a solvent, and may be contained in the aqueous electrolyte in a state of being dissociated into protons (H⁺) and anions (R⁻). The lithium salt contained as the electrolyte salt also may be in a state of being dissolved in water and dissociated into lithium ions (Li⁺) and counter anions.

The aqueous electrolyte contained in the aqueous electrolyte layer 6 is in an acidic condition (pH<7), at least in a state where the air battery 1 is charged. In the aqueous air battery 1 containing the aqueous electrolyte of the acidic condition as described above, the reaction on the air electrode 8 side (positive electrode reaction) and the reaction on the negative electrode 3 side during charge and discharge as shown below. During discharging of the air battery 1, each electrode reaction proceeds towards the right direction, whereas during charging, each electrode reaction proceeds towards the left direction.

$$O_2 + 4H^+ + 4e^- \rightleftharpoons 2H_2O \text{(air electrode side)}$$

$$RH + Li \rightleftharpoons RLi + H^+ + e^- \text{(negative electrode side)}$$

An example of how the air battery 1 operates during discharging will be described. When oxygen (O₂) can be supplied from the outside to the air electrode 8, and the electric circuit is in a closed state where the negative electrode 3 and the air electrode 8 are electrically connected via an external circuit (not shown), the air battery 1 can be discharged.

Lithium ions (Li⁺) are supplied form the negative electrode 3 through the intermediate layer 4 and the solid electrolyte layer 5 to the aqueous electrolyte layer 6. Electrons (e⁻) are supplied from the negative electrode 3 through the external circuit (and load) to the air electrode 8 (not shown). For example, Li ions and electrons may be generated by dissociation of Li atoms of the lithium metal contained as the negative electrode active material in the negative electrode 3. Alternatively, Li ions and electrons may be extracted from the negative electrode active material through an extraction reaction.

To the air electrode 8, oxygen ($O_2$) is supplied from the outside, and protons ($H^+$) are selectively supplied from the aqueous electrolyte layer 6 through the proton conduction layer 7. Electrons ($e^-$) are supplied via the external circuit to the air electrode 8 as described above. In the air electrode 8, the above reaction on the air electrode side proceeds, and oxygen is reduced to generate water ($H_2O$). The generated water may move from the air electrode 8 to the aqueous electrolyte layer 6.

As described above, the protons derived from the polyprotic acid can pass through the proton conduction layer 7 and move from the aqueous electrolyte layer 6 to the air electrode 8, and can therefore participate in the discharge reaction at the air electrode 8. In contrast, the polyprotic acid anions ($R^-$) are blocked by the proton conduction layer 7, and it is therefore possible to suppress the decomposition reaction of the polyprotic acid at the air electrode 8 in association with the charge and discharge of the air battery 1.

Since the polyprotic acid in the aqueous electrolyte has a high solubility, the lithium salt of the polyprotic acid, which is the discharge product as shown in the above negative electrode side reaction, is apt to remain in a state of being dissolved into polyprotic acid anions and lithium ions within the aqueous electrolyte layer 6. That is, the discharge product does not easily precipitate as a solid matter in the aqueous electrolyte layer 6. Therefore, the capacity of the air battery 1 can be increased. In addition, the discharge product does not easily precipitate even if the concentration of the discharge product increases. Thus, even if the volume of the aqueous electrolyte layer 6 is reduced, a high capacity can be exhibited, and the energy density can be improved. Furthermore, because of the high solubility of the discharge product, it is possible to avoid performance degradation that may be caused by separating the aqueous electrolyte layer 6 and the air electrode 8 by the proton conduction layer 7.

The air battery can exhibit high energy density, and therefore can be favorably used as a light-weight and small power supply. Use of an air battery is not particularity limited including conventionally known use, an example of which may include an electric aircraft. The electric aircraft includes an unmanned aircraft such as a drone.

The intermediate layer 4 separates the negative electrode 3 from the solid electrolyte layer 5, thereby preventing the reduction reaction of the solid electrolyte contained in the solid electrolyte layer 5 by the negative electrode active material. If the material configuring the solid electrolyte layer 5 has a high resistance against reduction, the intermediate layer 4 may be omitted.

The intermediate layer 4 prevents contact between the negative electrode 3 and the solid electrolyte layer 5, but does not inhibit movement of carrier ions such as lithium ions. For example, the intermediate layer 4 may have lithium ion conductivity. According to an aspect, the intermediate layer 4 may contain a nonaqueous electrolyte. Details of the nonaqueous electrolyte will be described later.

Figure 2:
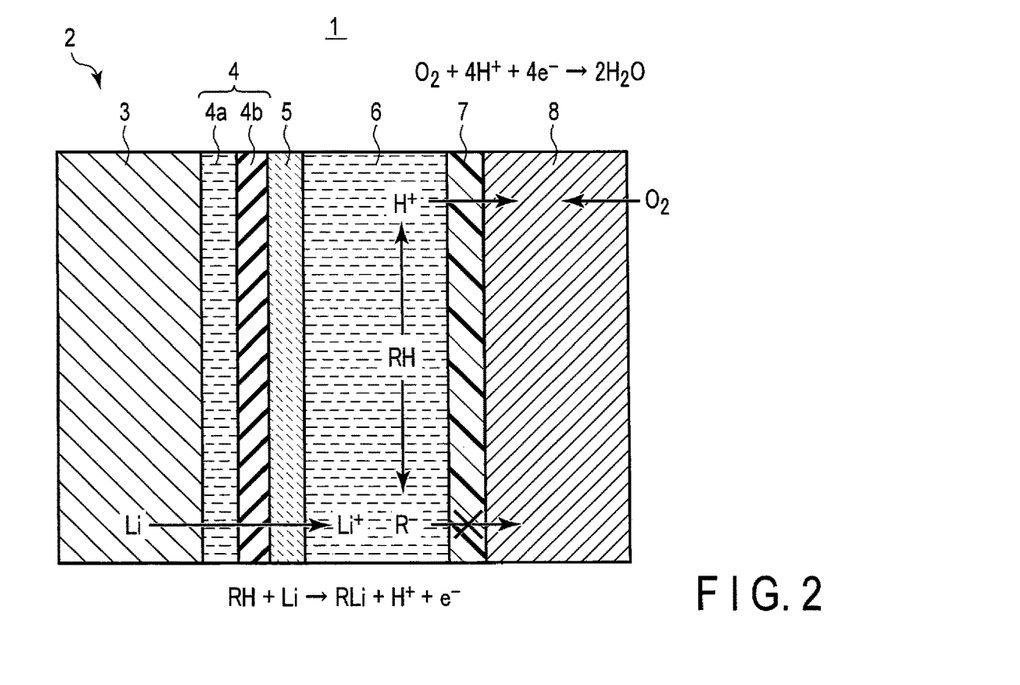
FIG. 2 is a conceptual diagram representing another example of the air battery according to the embodiment.

According to another aspect, the intermediate layer 4 may include plural sub-layers. An example of the air battery 1 including such an intermediate layer is shown in FIG. 2. In the example of FIG. 2, the aspect of the intermediate layer 4 differs from that of the example of FIG. 1. Other details are the same, and thus description thereof will be omitted.

In the air battery 1 of FIG. 2, the intermediate layer 4 includes a nonaqueous electrolyte layer 4a and a metal oxide layer 4b. The nonaqueous electrolyte layer 4a and the metal oxide layer 4b are respectively arranged on the negative electrode 3 side and the solid electrolyte layer 5 side. With the intermediate layer 4 having such a structure, it is possible to better suppress the reaction between the negative electrode active material such as a lithium metal and the solid electrolyte, leading to improvement in cycle performance.

In the above, the example of the lithium-air battery using the aqueous electrolyte has been described, but the air battery according to the embodiment is not limited to a lithium-air battery. For example, as carrier ions, sodium ions, potassium ions, cesium ions, calcium ions, magnesium ions, and aluminum ions may be used in place of lithium ions. Namely, the air battery according to the embodiment may be, for example, an aqueous electrolyte-air battery containing, as a negative electrode active material, sodium, potassium, cesium, calcium, magnesium, or aluminum, and containing an aqueous electrolyte in which sodium ions, potassium ions, cesium ions, calcium ions, magnesium ions, or aluminum ions are dissolved as the electrolyte salt in the aqueous solution.

Next, a detailed description will be provided for the negative electrode, air electrode, solid electrolyte layer, aqueous electrolyte layer, proton conduction layer, intermediate layer, container member, positive electrode terminal, and negative electrode terminal.

1) Negative Electrode

The negative electrode may contain a negative electrode active material. The negative electrode may include a negative electrode active material layer including a negative electrode active material. The negative electrode may further include a negative electrode current collector supporting a negative electrode active material layer. The negative electrode may be configured by a negative electrode active material layer.

As a negative electrode active material, for example, metal or alloy capable of inserting/extracting carrier ions such as lithium ions may be used. Specific examples include materials used for lithium battery electrodes such as lithium metals and lithium alloys. Other examples of the negative electrode active material may include aluminum metal, zinc metal, aluminum alloy, and zinc alloy. Another example of the negative electrode active material may include a material capable of insertion-extraction (intercalation) of carrier ions. Specific examples thereof include a metal oxide, metal sulfide, metal nitride, alkali metal-containing complex oxide, alkaline earth metal-containing complex oxide, and carbonaceous material into/out from which carrier ions are inserted-extracted. For example, a material commonly used as an electrode active material in a secondary battery such as a lithium ion battery or a sodium ion battery may be used as the negative electrode active material in an air battery. One of the above-described metals, alloys, metal compounds, complex oxides, and carbonaceous materials may be used as the negative electrode active material, or a combination of two or more thereof may be used as the negative electrode active material.

Examples of the alloy may include aluminum alloy, tin alloy, lead alloy, and silicon alloy. Specific examples thereof may include lithium alloy, such as lithium aluminum alloy, lithium tin alloy, lithium lead alloy, and lithium silicon alloy.

Examples of the metal oxide may include tin oxide, silicon oxide, lithium-containing titanium oxide, titanium oxide, niobium oxide, and tungsten oxide. The metal oxide as the negative electrode active material may be referred to as a first metal oxide, herein.

Examples of the metal sulfide include tin sulfide and titanium sulfide.

Examples of the metal nitride include lithium cobalt nitride, lithium iron nitride, and lithium manganese nitride.

Examples of the carbonaceous material capable of insertion-extraction of lithium ions include graphitic materials or carbonaceous materials such as graphite, coke, carbon fiber, and spherical carbon, or graphitic materials or carbonaceous materials obtained by subjecting thermosetting resin, isotropic pitch, mesophase pitch, mesophase pitch carbon fiber or mesophase microbeads to heat treatment at 500° C. to 3000° C.

In the negative electrode active material layer, a binder may be contained together with the negative electrode active material. Examples of the binder include polytetrafluoroethylene (PTFE), polyvinylidene fluoride (PVdF), ethylene-propylene-butadiene rubber (EPBR), styrene-butadiene rubber (SBR), and carboxymethyl cellulose (CMC). One of the above may be used as binder, or alternatively, 2 or more may be used in combination as the binder.

The blending proportions of the negative electrode active material and binder in the negative electrode active material layer are preferably within the ranges of from 80% by mass to 98% by mass for the negative electrode active material and from 2% by mass to 20% by mass for the binder.

As the negative electrode current collector, an electrically conductive substrate with a porous structure or a nonporous electrically conductive substrate may be used. These conductive substrates may be formed of, for example, copper, stainless steel, or nickel. As the electrically conductive substrate having a porous structure, a mesh, a punched metal, an expanded metal, or the like may be used. Alternatively, after having a metal foil support a negative electrode active material, the metal foil may be provided with a through-hole and used as the electrically conductive substrate having a porous structure. The negative electrode current collector may be omitted.

The negative electrode may be fabricated, for example, as follows. The negative electrode active material and binder are kneaded in the presence of a solvent, the obtained suspension is applied onto the current collector, then dried. Thereafter, the obtained stack is subjected to pressing at a desired pressure once or in multiple steps of 2 to 5 times, to thereby provide the negative electrode.

In addition, when the above-mentioned metal or alloy is used as the negative electrode active material, such a metallic material can be processed into a sheet, whereby the negative electrode active material layer can be formed without using the binder. Further, the negative electrode active material layer formed of such a metallic material can be directly connected to the negative electrode terminal, without having a negative electrode current collector interposed therebetween.

2) Air Electrode

The air electrode (positive electrode) may include an oxygen reaction layer (positive electrode reaction layer). The air electrode may further include a positive electrode current collector supporting the oxygen reaction layer. The air electrode may be configured by the oxygen reaction layer. The air electrode uses oxygen supplied from the outside of the battery to the oxygen reaction layer as active material.

The oxygen reaction layer includes a material having electrical conductivity, and has a structure exhibiting gas diffusivity. For example, as the oxygen reaction layer, a sheet material containing carbon fibers such as carbon paper, carbon cloth, and carbon nonwoven fabric may be used. Alternatively, a porous material formed from metal such as stainless steel, nickel, aluminum, or iron may be used as the oxygen reaction layer. Moreover, a porous body having a layer shape may be formed using an electrically conductive material, and may be used as the oxygen reaction layer. The oxygen reaction layer formed from the electrically conductive material may contain a binder.

The electrically conductive material formed as a layer and used as the oxygen reaction layer is not particularly limited, and any material may be used as long as the material has electrical conductivity. As the electrically conductive material, a material that does not dissolve in an aqueous electrolyte and hardly oxidized by oxygen is preferable. Specific examples include carbonaceous materials, electrically conductive ceramics and metals. Examples of the carbonaceous materials include natural graphite, artificial graphite, graphene, carbon fibers, carbon nanotubes, ketjen black, acetylene black, carbon black, furnace black, activated carbon, activated carbon fibers and charcoal. Examples of the electrically conductive ceramic include oxides of metals such as In and Sn, and carbides such as SiC. Examples of the metal include metals such as Al and Ti, and alloys such as SUS.

The oxygen reaction layer may further contain a catalyst that lowers the oxygen oxidation-reduction/evolution overvoltage, and promotes the oxygen oxidation-reduction/evolution reaction. The catalyst may be supported on, for example, the outer surface or the pore inner wall surface of the porous material configuring the oxygen reaction layer. Alternatively, the catalyst may be supported on the surface of the electrically conductive material included in the oxygen reaction layer.

The catalyst may be selected, for example, from catalytically active metals, metal oxides, complexes and the like conventionally used as a positive electrode catalyst for air batteries or a positive electrode catalyst for fuel cells electrolysis of water. The catalytically active metal is preferably at least one selected from the group consisting of Au, Pt, Pd, Ir, Ru, and Ag. The catalytically active metal oxide is preferably an oxide including at least one metal selected from the group consisting of Ti, Zr, V, Nb, Ta, Cr, Mo, W, Mn, Fe, Sn, Co, Rh, Ir, Ni, Cu, Ag, In, Sn, La and Ce. The metal oxide used for the catalyst of the air electrode may be referred to as a second metal oxide, herein. The catalytically active complex is preferably a complex having at least one metal selected from Fe, Ni and Co as metal center(s) and having a planar quadridentate ligand such as phthalocyanine, porphyrin and salen.

Regarding the sheet material containing carbon fibers such as carbon paper and the porous material made of metal, they themselves have both physical strength and electrical conductivity. Thus, the current collector may be omitted, and the oxygen reaction layer using these materials may be used alone as an air electrode.

The binder may maintain a layer shape of electrically conductive materials such as carbonaceous materials and attach the materials to the current collector. As the binder, for example, polytetrafluoroethylene (PTFE), polyvinylidene fluoride (PVdF), ethylene-propylene-butadiene rubber (EPBR), and styrene-butadiene rubber (SBR) may be used.

The blending proportion of the electrically conductive material and binder in the oxygen reaction layer is preferably within a range of 70% by mass to 98% by mass for the electrically conductive material, and 2% by mass to 30% by mass for the binder.

When including the catalyst, the blending proportions of the catalyst, the electrically conductive material, and the binder in the oxygen reaction layer are preferably within ranges of 1% by mass to 20% by mass for the catalyst, 1% by mass to 90% by mass for the electrically conductive material, and 1% by mass to 30% by mass for the binder.

The oxygen reaction layer may hold water or an aqueous solvent. A part of water and the aqueous solvent contained in the aqueous electrolyte may permeate into the oxygen reaction layer from the aqueous electrolyte layer through the proton conduction layer. Water generated in the discharge reaction may be contained in the oxygen reaction layer.

The thickness of the oxygen reaction layer (excluding the current collector) is preferably within a range of 2 μm to 600 μm.

As the positive electrode current collector, a porous electrically conductive substrate is preferably used in order to perform rapid diffusion of oxygen. Specific examples include a mesh, punched metal, expanded metal, and the like. Materials for the electrically conductive substrate include stainless steel, nickel, aluminum, iron, titanium, and the like. The surface of the current collector may be coated with antioxidant metal or alloy to suppress oxidation.

The oxygen reaction layer can be formed, for example, by mixing an electrically conductive material such as a carbonaceous material and a binder, pressing this mixture into a film, and drying.

Alternatively, the air electrode can also be fabricated as follows. An electrically conductive material such as a carbonaceous material and a binder are mixed in a solvent, applied onto a current collector, then dried. Thereafter, by pressing the obtained stack, an air electrode can be obtained.

3) Solid Electrolyte Layer

The solid electrolyte layer contains a material that does not dissolve and swell in the aqueous electrolyte, and has ion conductivity with respect to carrier ions such as lithium ions. The solid electrolyte layer is desirably nonporous and selectively transmits carrier ions. From the perspective of suppressing degradation of the negative electrode, solid electrolyte that does not transmit water is more desirably used.

As the material having ion conductivity, for example, one or more solid electrolyte selected from the group consisting of a composite between an organic polymer and an electrolyte salt, an oxide, and a sulfide may be used. These materials exhibit ion conductivity in a solid state, and thus can realize the nonporous solid electrolyte layer that selectively transmits lithium ions.

The organic polymer is used together with an electrolyte salt. Specific examples of the organic polymer include a polyethylene oxide containing-polymer and a polyvinyl-containing polymer. The polyethylene oxide containing-polymer may contain polyethylene oxide as a main chain, and a part thereof may be branched. At the end of the polyethylene oxide, the hydroxyl group is preferably protected by ether or an ester bond. The polyvinyl-containing polymer contains a polyvinyl chain as a main chain and preferably contains a functional group having an ester bond or an ester carbonate bond in a side chain branched from the main chain. In particular, the polyethylene oxide containing-polymer is desirable because of excellent hopping conductivity of lithium ions. The organic polymer may contain a small amount of softening agents such as dibutyl phthalate.

For the electrolyte salt used with the organic polymer, for example, there may be used an electrolyte salt (supporting electrolyte) that can be used for secondary batteries like lithium ion secondary batteries and sodium ion secondary batteries. Specifically, the electrolyte salts that may be contained in the aqueous electrolyte, as described later, may be used.

Examples of the oxide include oxide glasses and oxide crystals. Unlike the organic polymer, any of those oxides exhibit ion conductivity without being used together with an electrolyte salt. Examples of the oxide glasses include oxides including Li and one or more elements selected from the group consisting of B, Si, and P. Specific examples thereof include $Li_4SiO_4$—$Li_3BO_3$ based oxides. Examples of the oxide crystals include oxides including Li and one or more elements selected from the group consisting of Al, Ti, P, La, N, Si, In, and Nb.

As the oxide-based solid electrolyte, a lithium phosphate solid electrolyte having a NASICON structure and represented by a general formula $LiMe_2(PO_4)_3$ is preferably used. Me in the above formula is preferably at least one selected from the group consisting of titanium (Ti), germanium (Ge), strontium (Sr), zirconium (Zr), tin (Sn), and aluminum (Al). The element Me preferably includes Al and one among Ge, Zr, and Ti.

Specific examples of the lithium phosphate solid electrolyte having the NASICON structure include LATP ($Li_{1+x+y}Al_xTi_{2-x}Si_yP O_{12}$; $0<x \le 2$, $0 \le y < 3$), a compound represented by $Li_{1+z+y}Al_zGe_{2-z}PO_{12}$ where $0 \le z \le 2$ and $0 \le y < 3$, a compound represented by $Li_{1+z}Al_zZr_{2-z}(PO_4)_3$ where $0 \le z \le 2$, and a compound represented by $Li_{1+2w}Ca_wZr_{1-w}(PO_4)_3$ where $0 \le w < 1$.

In addition to the above lithium phosphoric acid solid electrolyte, examples of the oxide-base solid electrolyte include amorphous LIPON compounds represented by $Li_aPO_bN_c$ where $2.6 \le a \le 3.5$, $1.9 \le b \le 3.8$, and $0.1 \le c \le 1.3$ (e.g., $Li_{2.9}PO_{3.3}N_{0.46}$); a compound having a garnet structure and represented by $Li_{5+d}X_dLa_{3-d}M\alpha_2O_{12}$ where X is one or more selected from the group consisting of Ca, Sr, and Ba, Ma is one or more selected from the group consisting of Nb and Ta, and $0 \le d \le 0.5$; a compound represented by $Li_3M\beta_{2-d}L_2O_{12}$ where Mβ is one or more selected from the group consisting of Ta and Nb, L may include Zr, and $0 \le d \le 0.5$; a compound represented by $Li_{7-3d}Al_dLa_3Zr_3O_{12}$ where $0 \le d \le 0.5$; and a LLZ compound represented by $Li_{5+e}La_eM\gamma_{2-e}Zr_eO_{12}$ where Mγ is one or more selected from the group consisting of Nb and Ta, and $0 \le e \le 2$ (e.g., $Li_7La_3Zr_2O_{12}$).

In addition, as the solid electrolyte, a sodium-containing solid electrolyte may be used. The sodium-containing solid electrolyte is excellent in ion conductivity of sodium ions. Examples of the sodium-containing solid electrolyte include β-alumina, sodium phosphorus sulfides, sodium phosphates, $Na_3Zr_2Si_2PO_{12}$, and the like. The sodium ion-containing solid electrolyte is preferably in a form of glass ceramics.

Examples of the sulfide include sulfide glasses and sulfide crystals. Unlike the organic polymer, any of those sulfides exhibit ion conductivity without being used together with an electrolyte salt. Specific examples thereof include $Li_3PS_4$, $Li_4SiS_4$, $LiGeS_4$—$Li_3PS_4$, $Li_2S$—$SiS_2$ based sulfides, $SiS$—$P_2S_5$ based sulfides, $Li_2S$—$B_2S_3$ based sulfides, and $Li_2S$—$SiS_2$—$Li_4SiO_4$ based sulfides. Among them, $Li_2S$—$P_2S_5$, $Li_{3.25}Ge_{0.25}P_{0.75}S_4$, and the like are preferred because of high ion conductivity.

One of the above solid electrolyte may be used in the solid electrolyte layer, or alternatively, two or more of the above solid electrolytes may be used.

The solid electrolyte layer may be a solid electrolyte composite film containing a solid electrolyte. The solid electrolyte composite film includes, for example, solid-electrolyte particles that are molded into the form of a film using a polymeric binder. The solid electrolyte composite film may further include a porous self-supported film supporting the film containing the solid electrolyte and polymeric binder. The porous self-supported film includes a self-supported film formed of polyolefin, such as polyethylene (PE) or polypropylene (PP), or cellulose.

Examples of the polymeric binder include a polyvinyl-based binder, a polyether-based binder, a polyester-based binder, a polyamine-based binder, a polyethylene-based binder, a silicone-based binder, and a polysulfide-based binder.

As described above, oxide-based and sulfide-based solid electrolytes exhibit conductivity to carrier ions even without electrolyte salt. An electrolyte salt may be added to a solid electrolyte layer using these oxides or sulfides, as well. By containing an electrolyte salt in the solid electrolyte layer, for example, an alkali metal ion conductivity of the solid electrolyte layer can be further increased.

The solid electrolyte layer may have a thickness of, for example, 100 μm or less. Furthermore, the thickness of the solid electrolyte layer may be, for example, 20 μm or more.

4) Aqueous Electrolyte Layer

The aqueous electrolyte layer is positioned between the solid electrolyte layer and the proton conduction layer and contains the aqueous electrolyte.

The aqueous electrolyte layer may further include a porous body for holding the aqueous electrolyte. As the porous body, for example, a porous film, cellulose nonwoven fabric, synthetic resin nonwoven fabric, glass fiber nonwoven fabric, or the like, containing polyethylene (PE), polypropylene (PP), or polyvinylidene fluoride (PVdF), may be used.

The porosity of the porous body is preferably from 30% to 90%. With a porosity of 30% or higher, a high electrolyte retaining property can be exhibited. With a porosity of 90% or lower, a high strength can be achieved. A preferable range of the porosity is from 35% to 60%.

The aqueous electrolyte may be a liquid aqueous electrolyte containing a polyprotic acid, aqueous solvent, and lithium salt, for example. The electrolyte may be a gel aqueous electrolyte formed as a composite of a liquid aqueous electrolyte and a polymeric material.

The liquid aqueous electrolyte is prepared, for example, by dissolving polyprotic acid at a concentration of 1 mol/L to 14 mol/L and electrolyte salt at a concentration of 0.1 mol/L to 14 mol/L in the aqueous solvent.

The polyprotic acid contained in the aqueous electrolyte has two or more carboxyl groups, like citric acid. Such a polyprotic acid is not limited to citric acid. Examples of the polyprotic acid having two or more carboxyl groups include citric acid, maleic acid, and phthalic acid.

The aqueous solvent is a solvent including water, and may be formed of water alone or a combination of water and a solvent other than water. Examples of the solvent other than water include a water-soluble organic solvent. Examples of the water-soluble organic solvent include γ-butyrolactone, acetonitrile, alcohols, N-methylpyrrolidone (NMP), dimethylacetamide, dimethyl sulfoxide, tetrahydrofuran, and the like. One solvent other than water may be included in the aqueous solvent, or alternatively, two or more solvents other than water may be used in combination. In the aqueous solvent, the content of the solvent other than water is desirably 20 mass % or less.

Concerning the electrolyte salt that the aqueous electrolyte may contain, examples include a lithium salt and sodium salt. Here, the electrolyte salt to be contained in the aqueous electrolyte may be referred to as a first electrolyte salt. A lithium salt as the first electrolyte salt may be referred to as a first lithium salt, and a sodium salt as the first electrolyte salt may be referred to as a first sodium salt.

Examples of the first lithium salt include LiCl, LiBr, LiOH, $Li_2SO_4$, $LiNO_3$, lithium bis (trifluoromethanesulfonyl) imide (LiTFSI: $LiN(SO_2CF_3)_2$), lithium bis (fluorosulfonyl) imide (LiFSI: $LiN(SO_2F)_2$), lithium bis oxalate borate (LiBOB: $LiB[(OCO)_2]_2$), and the like. One of the above lithium salts may be used as the first electrolyte salt, or alternatively, two or more of the above lithium salts may be used in combination.

Examples of the first sodium salt include NaCl, $Na_2SO_4$, NaOH, $NaNO_3$, NaTFSA (sodium trifluoromethanesulfonylamide), and the like. One of the above sodium salts may be used as the first electrolyte salt, or alternatively, two or more of the above sodium salts may be used in combination.

In addition, one or more each of the first lithium salt and the first sodium salt may be combined and contained in the aqueous electrolyte as the first electrolyte salt. The first electrolyte salt may include electrolyte salts other than lithium salt and sodium salt. Suitable electrolyte salts may be selected in accordance with carrier ions.

Examples of the polymeric material include polyvinylidene fluoride (PVdF), polyacrylonitrile (PAN), polyethylene oxide (PEO), and the like. The content of the polymeric material in the electrolyte is, for example, in a range of 0.5% by mass or more and 10% by mass or less.

The aqueous electrolyte layer may have a thickness of from 250 μm to 1000 μm. In a system in which a discharge product precipitates as a solid matter, with a member housing the electrolyte on the air electrode side being thicker and having a larger volume, a space for housing the discharge product can be secured, and therefore the discharge capacity can be increased. However, from the viewpoint of the battery's weight reduction and miniaturization, it is desirable that the volume occupied by the electrolyte is small. In the air battery according to the embodiment, the aqueous electrolyte contains the polyprotic acid described above, and therefore the discharge product is not apt to precipitate. Thus, even if the aqueous electrolyte layer is thinner, a high capacity can be exhibited.

Inclusion of water in the aqueous electrolyte can be examined by gas chromatography-mass spectrometry (GC-MS) measurement. Further, the salt concentration and the water content in the aqueous electrolyte can be measured by inductively-coupled plasma (ICP) emission analysis or the like, for example. By weighing out a specified amount of the aqueous electrolyte and calculating the concentration of salt contained therein, the molar concentration (mol/L) can be calculated. Further, by measuring the specific gravity of the aqueous electrolyte, the number of moles of the solute and the solvent can be calculated.

The polyprotic acid contained in the aqueous electrolyte can be measured through qualitative analysis using, for example, proton nuclear magnetic resonance ($^1$H-NMR). Furthermore, capillary electrophoresis can be used for quantitative analysis of the polyprotic acid.

5) Proton Conduction Layer

The proton conduction layer selectively conducts protons between the aqueous electrolyte layer and the air electrode. The proton conduction layer blocks movement of polyprotic acid anions from the aqueous electrolyte to the air electrode.

The proton conduction layer is formed using, for example, a fluorine resin having a sulfonic acid group (e.g., Nafion (registered trademark; DuPont) and Flemion (registered trademark; Asahi Kasei)), or a proton conductive material such as a tungstic acid or phosphotungstic acid.

The proton conduction layer may further contain a binder in addition to the above-described proton conductive material. As the binder, the above-described binder that can be contained in the air electrode or the negative electrode may be used.

In the proton conduction layer, water or an aqueous solvent may be held. A part of water and the aqueous solvent contained in the aqueous electrolyte may permeate from the aqueous electrolyte layer into the proton conduction layer. Water generated upon the discharge reaction in the air electrode may be supplied to the proton conduction layer.

The proton conduction layer may have a thickness of, for example, 100 μm or less.

6) Intermediate Layer

If the oxide and/or sulfide is used for the solid electrolyte layer, the oxide and/or sulfide may be poor in resistance against reduction. In such a case, an intermediate layer is preferably provided between the negative electrode and the solid electrolyte layer to prevent reaction between the negative electrode and the solid electrolyte layer. By providing the intermediate layer, the negative electrode and the solid electrolyte layer would not be in contact with each other. Thus, it is possible to avoid deterioration of the solid electrolyte layer from reductive decomposition of the oxide and/or sulfide included in the solid electrolyte layer due to contact with the negative electrode.

As the intermediate layer, for example, a porous material such as a porous film or a nonwoven fabric may be provided. As the porous film or the nonwoven fabric, one which can be used as a separator for lithium-ion secondary batteries, such as a polyethylene porous film, a polypropylene (PP) porous film, and a cellulosic nonwoven fabric, may be used. The porous film or the nonwoven fabric may be impregnated with a nonaqueous electrolyte.

As the intermediate layer, for example, a metal oxide layer may be provided. As the metal oxide layer, for example, a metal oxide such as aluminum oxide, silicon oxide or zinc oxide may be used. If a metal oxide insoluble in a nonaqueous electrolyte is used, the nonaqueous electrolyte may be contained in the intermediate layer together with the metal oxide. The metal oxide used for the intermediate layer may be referred to as a third metal oxide, herein.

As the intermediate layer, the metal oxide layer and a nonaqueous electrolyte layer containing the nonaqueous electrolyte may be combined. In this case, it is preferable that the nonaqueous electrolyte layer is disposed on the negative electrode side, and that the metal oxide layer is disposed on the solid electrolyte layer side. Usable examples of the nonaqueous electrolyte layer include one in which the above-described porous film or nonwoven fabric is impregnated with the nonaqueous electrolyte, and a nonaqueous electrolyte layer formed from a gel nonaqueous electrolyte.

If the oxide and/or sulfide included in the solid electrolyte layer is excellent in resistance against reduction, omission of the intermediate layer is preferable from the perspective of improving volume energy density. An organic polymer tends to be excellent in resistance against reduction.

As the nonaqueous electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L. Herein, the electrolyte salt contained in the nonaqueous electrolyte may be referred to as a second electrolyte salt.

Examples of the second electrolyte salt include lithium salts (second lithium salts) such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), lithium bistrifluoromethylsulfonylimide (LiN(CF$_3$SO$_2$)$_2$), and mixtures thereof. Among the second lithium salts, LiPF$_6$, LiBF$_4$, LiCF$_3$SO$_3$, and LiCF$_3$SO$_3$ are particularly favorable.

The second electrolyte salt may include an electrolyte salt other than a lithium salt. Suitable electrolyte salts may be selected in accordance with carrier ions.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

7) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less. In a battery including such a metal container, drastic improvements in long-term reliability under high temperature environments and heat releasing properties become possible.

The shape of the container member is not particularly limited. The shape of the container member may be, for example, flat (thin), prismatic, cylindrical, coin-shaped, button-shaped, sheet-shaped, and stack-shaped. The container member may be appropriately selected depending on battery size and use of the battery.

8) Negative Electrode Terminal

The negative electrode terminal may be made of a material that is electrically stable within a potential range at which an absorption-release reaction or insertion-extraction reaction of carrier ions by the negative electrode active material proceeds, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. The negative electrode terminal is preferably made of the same material as the negative electrode current collector, in order to reduce contact resistance between the negative electrode terminal and the negative electrode current collector.

9) Positive Electrode Terminal

The positive electrode terminal may be made of, for example, a material that is electrically stable in the potential range at which the oxidation-reduction reaction of oxygen proceeds, and having electrical conductivity. Examples of the material for the positive electrode terminal include copper, nickel, stainless steel, aluminum, or an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Figure 3:
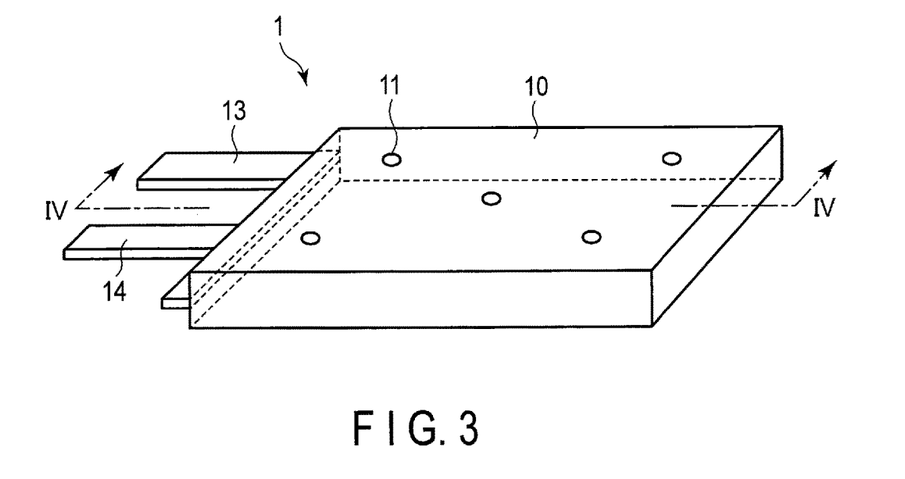
FIG. 3 is a perspective view schematically illustrating an example of the air battery according to the embodiment.
Figure 4:
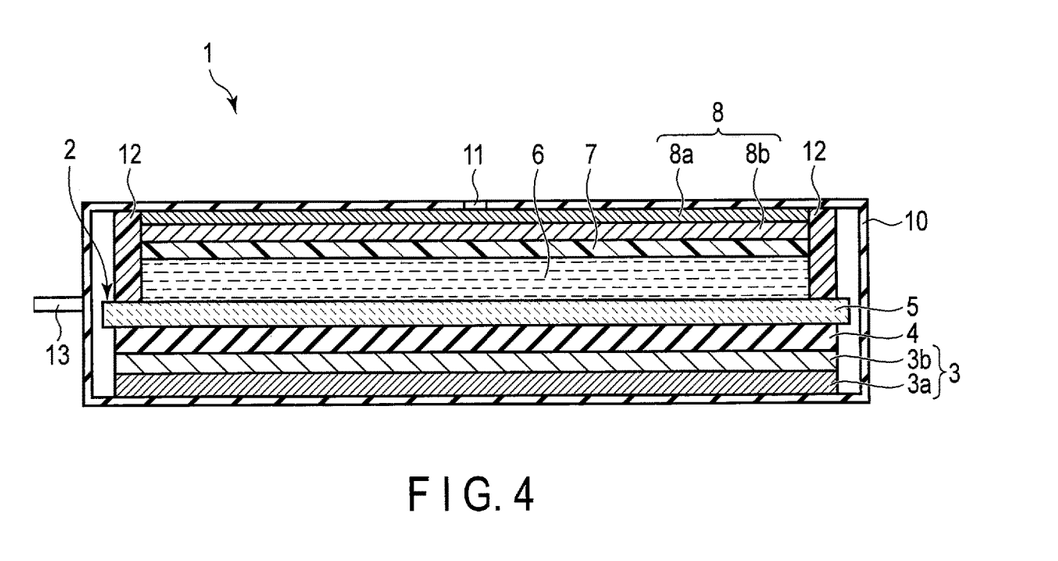
FIG. 4 is a schematic cross-sectional view taken along a line IV-IV in FIG. 3.

With reference to FIGS. 3 and 4, an example of the structure of the air battery according to the embodiment will be described. FIG. 3 is a perspective view schematically illustrating an example of the air battery according to the embodiment. FIG. 4 is a schematic cross-sectional view of the FIG. 3 taken along a line IV-IV.

The air battery 1 shown in FIGS. 3 and 4 includes a container member 10 formed of a laminate film, and an electrode group 2 housed in the container member 10. The container member 10 is formed by bonding the laminate film in a bag shape through heat sealing, using thermoplastic resin layers thereof. The electrode group 2 is configured of: a negative electrode 3 having a structure in which a negative electrode active material layer 3b is supported on a negative electrode current collector 3a made of, for example, a porous electrically conductive substrate; an air electrode 8 having a structure in which an oxygen reaction layer 8b is supported on a positive electrode current collector 8a made of, for example, a porous electrically conductive substrate; and a solid electrolyte layer 5, an aqueous electrolyte layer 6, and a proton conduction layer 7 disposed between the negative electrode 3 and the air electrode 8. The solid electrolyte layer 5, the aqueous electrolyte layer 6, and the proton conduction layer 7 are disposed in this order from the negative electrode 3 side to the air electrode 8 side. In the example illustrated, an intermediate layer 4 is further provided between the negative electrode 3 and the solid electrolyte layer 5 to prevent reaction between the negative electrode 3 and the solid electrolyte layer 5. Furthermore, in the example illustrated, a seal member 12 is provided to prevent moisture included in the aqueous electrolyte layer 6 from leaking and coming into contact with the negative electrode 3.

On the principal surface of the container member 10 on the air electrode 8 side, plural pores 11 are open for air intake.

The negative electrode 3 includes a negative electrode current collector 3a, and a negative electrode active material layer 3b provided on the negative electrode current collector 3a. The negative electrode current collector 3a may be omitted. The air electrode 8 (positive electrode) includes a positive electrode current collector 8a, and an oxygen reaction layer 8b provided on the positive electrode current collector 8a. The positive electrode current collector 8a may be omitted.

One end of a negative electrode terminal 13 is electrically connected to the negative electrode current collector 3a, and the other end protrudes outside the container member 10. One end of a positive electrode terminal 14 is electrically connected to the positive electrode current collector 8a, and the other end protrudes outside the container member 10.

Although not illustrated in the figures, when the battery is not in use, a sealing tape for sealing the pores 11 is provided on the outer surface of the container member 10.

In the air battery having the above-described structures, air is supplied from the pores 11 into the container member 10. The supplied air is further supplied to the oxygen reaction layer 8b of the air electrode 8, causing a discharge reaction with protons ($H^+$) supplied from the aqueous electrolyte layer 6.

In FIGS. 1 to 4 described above, the air electrode is provided on only one surface of the electrode group 2. Although illustration is omitted, both surfaces of the electrode group may be provided with positive electrodes.

The air battery according to the embodiment includes: the negative electrode; the air electrode to which oxygen is supplied; the solid electrolyte layer between the negative electrode and the air electrode; the aqueous electrolyte layer between the solid electrolyte layer and the air electrode; and the proton conduction layer between the aqueous electrolyte layer and the air electrode. The aqueous electrolyte layer includes the aqueous electrolyte containing the above-described polyprotic acid including anions having high solubility in water, the electrolyte salt, and water. The air battery has a high capacity and is excellent in cycle performance.

EXAMPLES

Examples will be described hereinafter, but the embodiments of the present invention are not limited to the examples listed below, so long as the embodiments do not depart from the spirit of the invention.

Example 1

An aluminum-containing laminate film including a polypropylene thermoplastic resin layer and an aluminum layer was prepared. The aluminum-containing laminate film was formed into a cup shape having a lid. On the lid portion, which is the plane that faces the air electrode, five pores having a diameter of 2 mm were provided. The battery container fabricated in this manner was prepared as a container member. At this time, the polypropylene layer was made the inner surface of the battery container. Next, a sealing tape was attached onto the outer surface of the lid portion to close the pores.

A nickel mesh to which one end of the negative electrode terminal was electrically connected was prepared as a negative electrode current collector. To this negative electrode current collector, a metal lithium foil as a negative electrode active material layer was compression-bonded. In this manner, the negative electrode was prepared.

An oxide crystal solid electrolyte LATP ($Li_{1.5}Al_{0.5}Ti_{1.5}(PO_4)_3$) particles, polyvinyl butyral (PVB) resin and NMP were mixed, thereby obtaining a solution mixture. A mass ratio between the LATP particles and the polyvinyl butyral resin was set to 9:1. The solid content concentration in the solution mixture was 60 mass %.

Next, the solution mixture was mixed by ball milling, thereby obtaining a slurry. Next, the slurry was applied onto one principal surface of a 25 μm thick porous PP film by a doctor blade method, and the resulting coating was dried to form a solid electrolyte layer. The thickness of the solid electrolyte layer formed on the PP film was about 20 μm.

A nonaqueous electrolyte was prepared as follows. 50 vol. % of ethylene carbonate and 50 vol. % of propylene carbonate were mixed to prepare a nonaqueous solvent. Into the obtained nonaqueous solvent, LiCl as electrolyte salt was dissolved at a concentration of 1.0 mol/L, to thereby prepare a liquid nonaqueous electrolyte.

By applying the liquid nonaqueous electrolyte dropwise onto the PP film surface, the film was impregnated with the nonaqueous electrolyte. Thereby, the intermediate layer including the PP film and the nonaqueous electrolyte was obtained.

The composite of the solid electrolyte layer and the intermediate layer was stacked onto the negative electrode such that the intermediate layer faced the surface of the metal lithium foil (negative electrode active material layer) of the negative electrode. This stack was housed in the cup portion of the battery container. At this time, the leading end of the negative electrode terminal was extended outside the cup portion.

An aqueous electrolyte was prepared as follows. Citric acid at a concentration of 3 M and LiCl at a concentration of 1 M were dissolved in water to obtain an aqueous solution.

A glass fiber filter paper having a thickness of 1 mm was placed on the solid electrolyte layer of the stack housed in the cup portion of the battery container, and a frame-shaped sealing member was disposed on the periphery thereof. The aqueous solution prepared as the aqueous electrolyte was poured and impregnated into the glass fiber filter paper, thereby obtaining the aqueous electrolyte layer.

As the proton conduction layer, a Nafion (registered trademark) proton exchange membrane was prepared.

The nickel mesh to which one end of the positive electrode terminal was electrically connected was prepared as the positive electrode current collector. To the positive electrode current collector, carbon paper was compression-bonded as the oxygen reaction layer. In this manner, the air electrode (positive electrode) was prepared.

The aqueous electrolyte layer was covered with the proton conduction layer, and the positive electrode was overlaid thereon so that the carbon paper was in contact with the proton conduction layer. At this time, the leading end of the positive electrode terminal was extended outside the cup portion. The cup portion of the battery container was closed by the lid portion to seal the battery container, thereby producing the air battery.

Example 2

An air battery was prepared according to the same procedure as in Example 1 except that, instead of citric acid, 1.5 M 1,2,3-propanetricarboxylic acid was used for the aqueous electrolyte on the air electrode side.

Example 3

An air battery was prepared according to the same procedure as in Example 1 except that, instead of citric acid, 3 M maleic acid was used for the aqueous electrolyte on the air electrode side.

Comparative Example 1

An air battery was prepared according to the same procedure as in Example 1 except that the proton conduction layer was omitted.

Comparative Example 2

An air battery was prepared according to the same procedure as in Example 1 except that the composition of the aqueous electrolyte on the air electrode side was changed as follows. Instead of 3 M citric acid and 1 M LiCl, LiCl at a concentration of 12 M and LiOH at a concentration of 1 M were dissolved in water to obtain an aqueous solution.

For each of the air batteries prepared as described above, the capacity was evaluated as follows. Each battery was subjected to a continuous discharge to 2.0 V at a constant current of a rate of 0.01 mA per 1 $cm^2$ of the air electrode, followed by constant voltage discharge at 2.0 V, and the initial discharge capacity was measured for each battery. The upper limit of the discharge capacity was limited to 40.0 mAh, and the discharge was cut when the capacity during discharging reached 40.0 mAh. The results thereof are shown in Table 1 below. Table 1 also lists the solute added to the aqueous electrolyte in each battery and the concentration of thereof, as well as the material of the proton exchange membrane. As the solute of the aqueous electrolyte, the polyprotic acid and the electrolyte salt are shown.

TABLE 1

| | Solute/Concentration | Proton Exchange Membrane | Initial Discharge Capacity |
|---|---|---|---|
| Example 1 | Citric acid/3M + LiCl/1M | Nafion film | 40.0 mAh (Capacity limit: 40.0 mAh cut) |
| Example 2 | 1,2,3-propane tricarboxylic acid/1.5M + LiCl/1M | Nafion film | 40.0 mAh (Capacity limit: 40.0 mAh cut) |
| Example 3 | Maleic acid/3M + LiCl/1M | Nafion film | 40.0 mAh (Capacity limit: 40.0 mAh cut) |
| Comparative Example 1 | Citric acid/3M + LiCl/1M | (none) | 40.0 mAh (Capacity limit: 40.0 mAh cut) |
| Comparative Example 2 | LiCl/12M + LiOH/1M | Nafion film | 17.8 mAh |

As shown in Table 1, in the batteries produced in Examples 1, 2 and 3 and Comparative Example 1, discharging had continued up to the capacity limit of 40.0 mAh. In contrast, in the battery produced in Comparative Example 2, the operation stopped before reaching the capacity limit, and the discharge capacity of only 17.8 m mAh was obtained. In Example 1 and Comparative Example 1, by having citric acid contained in the aqueous electrolyte, precipitation of LiOH as the discharge product was prevented, and battery operation impairment resulting from solid precipitation had not occurred. In Comparative Example 2, the battery operation was impaired by LiOH precipitation, and the battery had stopped midway during discharging.

In addition, for the air batteries produced in Example 1 and Comparative Example 1, the life performance was evaluated as follows. First, the battery was discharged under the same conditions as the above-described capacity evaluation except that discharging was cut when the discharge capacity reached 8 mAh, and the initial discharge capacity was measured. After being charged, the battery was discharged again, and the discharge capacity at that time was measured. The results are shown in FIGS. 5 and 6.

Figure 5:
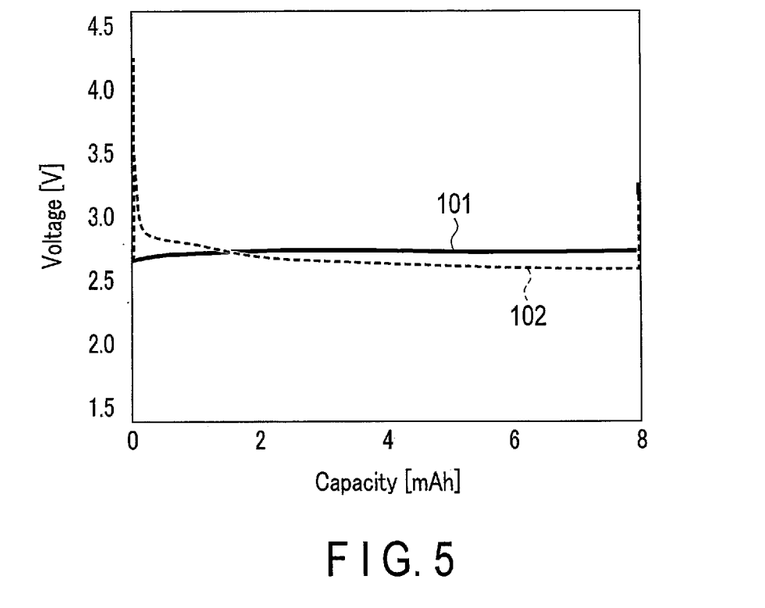
FIG. 5 is a graph showing an initial discharge curve and a second discharge curve of an air battery according to Example 1.

FIG. 5 is a graph showing an initial discharge curve and a second discharge curve of the air battery according to Example 1. In FIG. 5, a solid line 101 represents the initial discharge curve in Example 1, and a dashed line 102 represents a discharge curve in the second discharge after recharging in Example 1. FIG. 6 is a graph showing an initial discharge curve and a second discharge curve of the air battery according to Comparative Example 1. In FIG. 6, a solid line 201 represents the initial discharge curve in Comparative Example 1, and a dashed line 202 represents a discharge curve in the second discharge after recharging in Comparative Example 1.

Figure 6:
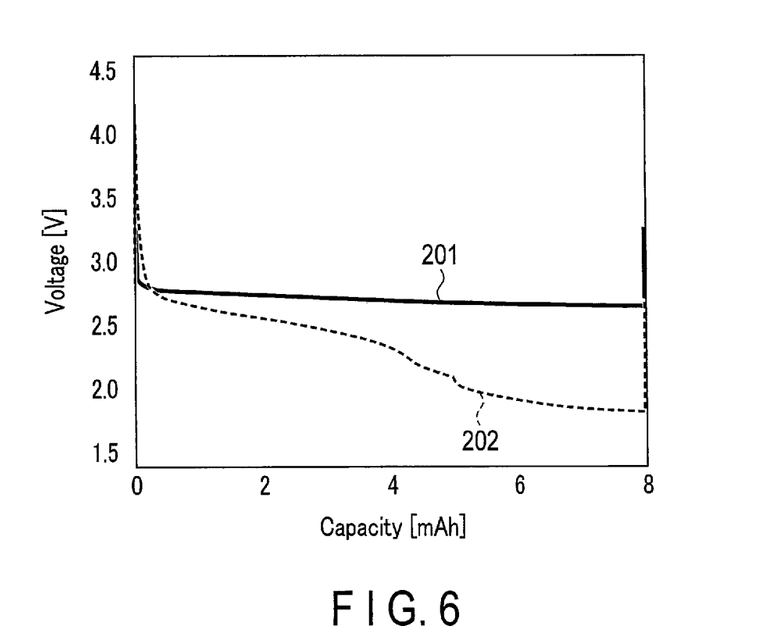
FIG. 6 is a graph showing an initial discharge curve and a second discharge curve of an air battery according to Comparative Example 1.

As shown in FIG. 6, in Comparative Example 1, a large decrease in the battery voltage was seen upon second discharge in comparison to the initial discharge. The drop in voltage was particularly significant at the end of discharge. In contrast, in Example 1, almost no difference in the voltage change was seen between the initial discharge and the second discharge. That is, the air battery produced in Example 1 demonstrated superior cycle life performance than the air battery of Comparative Example 1, and had a higher capacity than the air battery of Comparative Example 2. In Example 1, since Nafion (registered trademark) was provided as the proton conduction layer between the aqueous electrolyte layer and the air electrode, movement of the citric acid anions ($[C_6H_7O_7]^-$) in the aqueous electrolyte to the air electrode (carbon paper) was prevented, and decomposition of the citric acid anions on the air electrode was suppressed. In contrast, in Comparative Example 1, since no proton conduction layer was included, the citric acid anions were decomposed on the air electrode during charging and discharging, whereby the battery performance had deteriorated.

According to at least one embodiment and example described above, provided is an air battery including a negative electrode, an air electrode to which oxygen is supplied, a solid electrolyte layer, an aqueous electrolyte layer including an aqueous electrolyte, and a proton conduction layer. The solid electrolyte layer is positioned between the negative electrode and the air electrode. The aqueous electrolyte layer is positioned between the solid electrolyte layer and the air electrode. The proton conduction layer is positioned between the aqueous electrolyte layer and the air electrode. The aqueous electrolyte layer includes a polyprotic acid having two or more carboxyl groups, an electrolyte salt, and water. The air battery exhibits high capacity and excellent cycle life performance.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An air battery, comprising:
a negative electrode;
an air electrode to which oxygen is supplied;
a solid electrolyte layer positioned between the negative electrode and the air electrode;
a proton conduction layer positioned between an aqueous electrolyte layer and the air electrode; and
the aqueous electrolyte layer positioned between the solid electrolyte layer and the air electrode,
wherein
the aqueous electrolyte layer comprises an aqueous electrolyte including a polyprotic acid having two or more carboxyl groups, an electrolyte salt, and water; and
the air electrode does not contain a catalytically active metal, a catalytically active metal oxide, or a catalytically active complex.

2. The air battery according to claim 1, wherein the negative electrode comprises one or more negative electrode active material selected from the group consisting of a lithium metal, a lithium alloy, and a material into/out from which lithium is inserted-extracted.

3. The air battery according to claim 1, further comprising an intermediate layer positioned between the negative electrode and the solid electrolyte layer.

4. The air battery according to claim 3, wherein the intermediate layer comprises a nonaqueous electrolyte.

5. The air battery according to claim 3, wherein the intermediate layer comprises a metal oxide.

6. The air battery according to claim 3, wherein the intermediate layer comprises:
a nonaqueous electrolyte layer disposed on the negative electrode side; and
a metal oxide layer disposed on the solid electrolyte layer side.

7. The air battery according to claim 1, wherein the proton conduction layer comprises a fluorine resin having a sulfonic acid group, a tungstic acid or phosphotungstic acid.

* * * * *